United States Patent

[11] 3,571,885

| [72] | Inventor | John L. McGrath |
| | | 2020 Braun Drive, Golden, Colo. 80401 |
| [21] | Appl. No. | 774,357 |
| [22] | Filed | Nov. 8, 1968 |
| [45] | Patented | Mar. 23, 1971 |

[54] TRACTION STUD APPLICATOR
15 Claims, 5 Drawing Figs.

[52] U.S. Cl.................................................. 29/200, 29/212, 29/235
[51] Int. Cl.......................................................... B23p 19/04
[50] Field of Search.................................29/200, 200 (D), 212 (T), 212 (D), 235

[56] References Cited
UNITED STATES PATENTS

| 3,258,835 | 7/1966 | Buggild et al................. | 29/212 |
| 3,388,451 | 6/1968 | Holder .......................... | 29/235 |
| 3,475,807 | 11/1969 | Wise.............................. | 29/200X |

*Primary Examiner*—Thomas J. Eager
*Attorney*—Raymond Fink

ABSTRACT: An applicator for manually inserting traction studs into molded holes in tire tread portions by distending the diameter of the stud hole with extending fingers and simultaneously forcing the stud down.

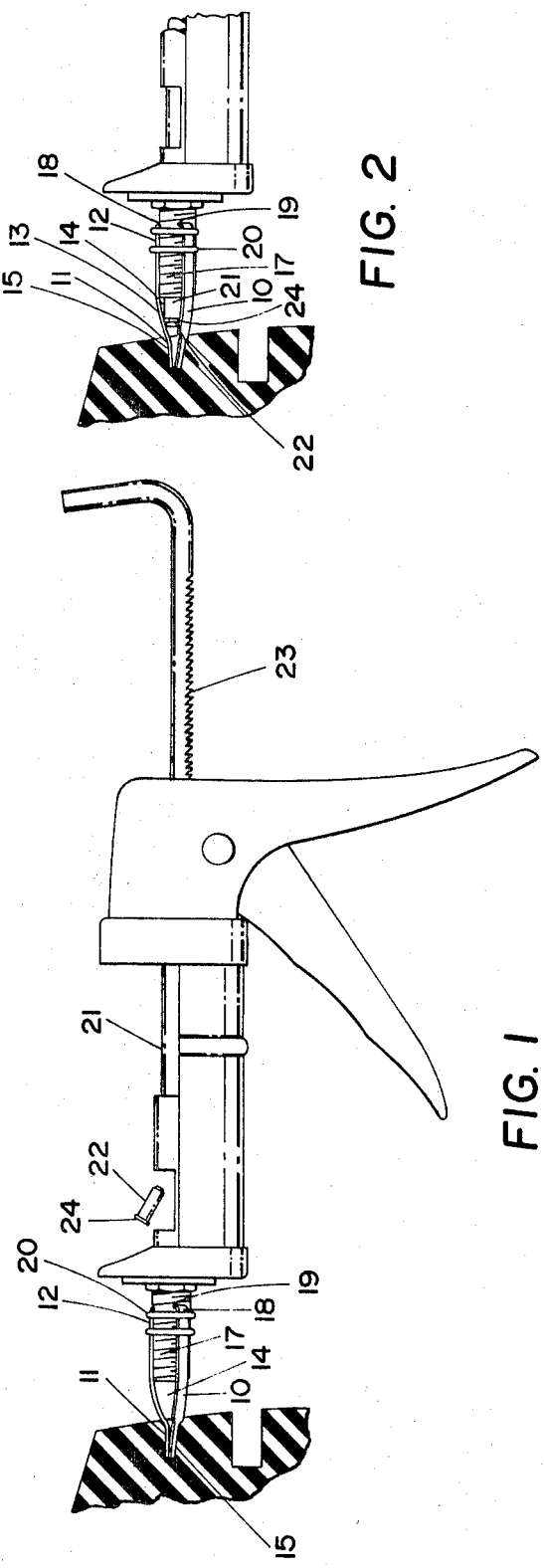
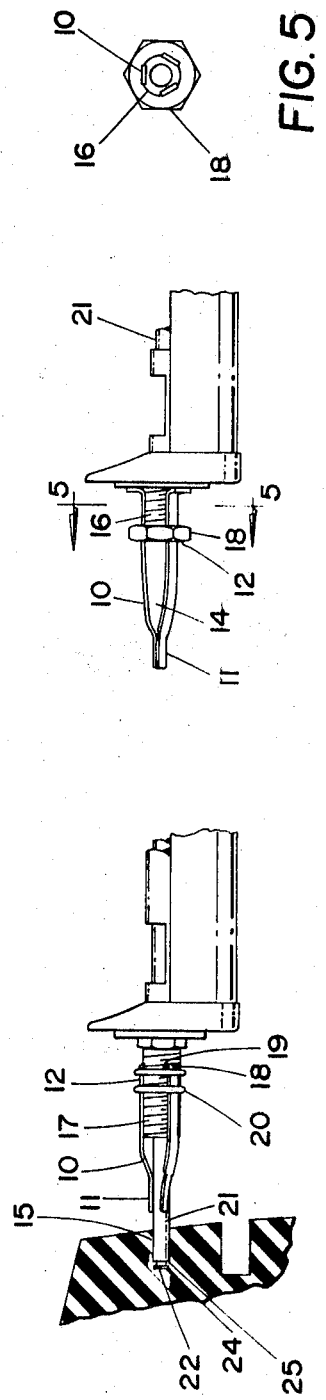
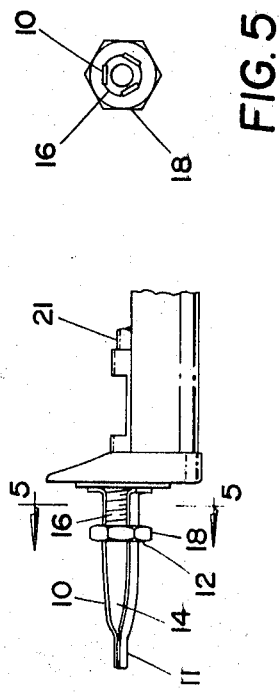
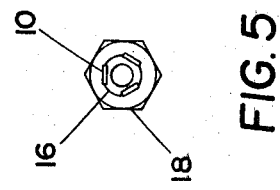

TRACTION STUD APPLICATOR

This invention relates to an apparatus and adapter for manually extending the diameter of a molded hole in a tire tread portion, inserting a traction stud into the hold and retrieving the apparatus thereby allowing for the insertion and seating of the stud in the tread portion of the tire.

It has been found that tungsten carbide, ceramic, and other extremely hard materials may be inserted into the tread portion leaving the outer tips exposed in order to increase traction of a tire, especially on packed snow and ice. The stud protrudes beyond the outer surface, thereby allowing, in addition to the tread design, an additional traction force by the bite of the protruded stud into the surface upon which the tire is riding.

Some devices have been developed for pneumatically driving the studs into a hole which has been molded into the tread portion. Few devices, however, have been developed which allow for manual insertion of the stud into the stud-receiving hole. This invention concerns an adapter to be used with commonly available manual-dispensing guns such as calking guns in order to expand the diameter of the molded hole, driving the stud into the hole while the diameter is held in the extended position and then retrieving the dispenser, allowing the stud to be retained solidly within the stud hole.

It is, therefore, an object of this invention to provide an adapter for connection to manual-operated dispensing guns to allow for insertion of studs into stud holes molded in the tread portion of a tire.

It is a further object to provide for an inserting device that may be inexpensively manufactured and may be manually operated.

Other advantages, objects, and uses of this invention will become obvious when the accompanying specification and drawings are considered.

FIG. 1 shows a traction stud gun with the tip inserted into a molded tire hole and the traction stud being positioned into the gun.

FIG. 2 shows a partial view of the gun with the adapter within the molded traction stud hole and the traction stud entering the hollow portion formed by the fingers of the adapter.

FIG. 3 shows the stud seated within the molded traction stud hole and the fingers forced out of the hole but with the cam rod still in the hole.

FIG. 4 shows a modified view of the adapter with the fingers positioned within channels formed in the outer periphery of the guide rod.

FIG. 5 shows a front view of FIG. 4 showing more clearly the position of the fingers within the channel.

The improvement with which this invention is concerned comprises a plurality of circumferentially arranged axially extending fingers 10, coacting and mating with one another in such a way as to be radially outwardly extendable on the tip portion 11 of the fingers. The fingers 10 preferably comprise a spring steel plate but may be rod or bar type which is pivotally attached to a mounting device 12 at one end and may be cam actuated radially outward and inward at the other end 11. The fingers 10 are circumferentially arranged to form a generally circular, hollow stud-receiving portion 14. The fingers, however, may be tapered in a converging configuration at the free end 11 and additionally, the fingers 10 are diminished in diametric relation to one another, diminishing from the pivotally affixed end to free tip end, all of which allows for insertion of the free end of the fingers into the stud-receiving hole 15.

The fingers at the attached end may be attached in a number of ways. A preferred manner is to secure the individual fingers in channel portions 16 on the outer circumference of a hollow rod 17 which acts as a guide tube. The outer surface of the rod 17 may be threaded and the fingers retained in the channel by means of a fastening nut 18 similarly threaded and secured around the outer periphery of the rod, thereby retaining the fingers within the channel on the outer circumference of the rod.

The fingers are radially biased inwardly into a seating configuration as determined by the spring rate of the steel. Other biasing means may be used such as a sphincter contained around the outer surface of the fingers. Such a sphincter may be of an elastic material or a spring retention device on any number of devices which will inwardly bias the fingers.

Another method for securing the fingers to the hollow rod is to have radially inward extending fasteners 18 on the fixed end of the fingers. The rod 17 is provided with fastener receiving openings 19 into which the fastening position of the finger is inserted. Retention means such as a band clamp or spring-wire clamp will then secure the fingers 10 around the outer periphery of the rod 17 thereby assuring the retention of the fasteners 18 in the fastener receiving openings 19 when such a clamp 20 is tightened around the fingers 10 and the rod 17.

The fingers are tapered from the fastened end to the free end in a diminishing diametric relation to allow for insertion of the free end 11 into a molded stud-receiving hole 15. The fingers may then be cam biased outwardly against the inner periphery to provide a radially outward movement of the free ends 11 of the fingers.

Cam means are most simply provided by a rachet driven cam rod 21 into which the traction stud 22 may be inserted. The outer diameter of the rachet driven cam rod is greater than the outer diameter of the traction stud 22. As the rod 21 is axially driven by means of the rachet 23 within the hollow finger portion 14, the seat 24 of the stud 22 engages the inner surface of the finger tips 11 forcing the fingers in a radially outward relationship. The traction stud 22 is driven along with and within the hollow portion 25 of the rachet driven rod 21 with the seating portion 24 of the traction stud 22 projecting beyond the end of the rod 21. The rachet 23 is actuated to a degree until the seating portion 24 of the stud is firmly on the bottom surface of the stud-receiving hole 15. Further actuation of the rachet forces the stud seat against the hole bottom thereby axially driving the fingers 10 out of the stud-receiving hole 15. As the free portion 13 of the fingers 10 is driven axially out of the hole, the rubber springs radially inward thereby gripping the stud within the hole.

Although the mechanical advantage provided by the rachet driven rod 21 allows for easier insertion, strictly manual insertion is also possible. This may be accomplished by forcing the traction stud-holding cam rod 21 axially guided by an outer guide tube 17. The adapter comprising the finger assembly 10 is secured to a free end of the outer guide tube 17 and is activated similarly as with the rachet version of the gun. Thus, as the cam rod 21 is axially forced through and guided by the hollow guide rod 17, the traction stud seat 24 similarly forces the fingers 10 radially outward and allows seating of the stud 22 within the stud hole 15.

Having thus described the invention with particular reference to a preferred form and certain modifications, it is obvious that thorough understanding of the invention will enable those skilled in the art to adapt various changes and other modifications in conjunction therewith without departing from the spirit and scope of the invention as defined by the claims appended thereto.

I claim:

1. In combination with a dispensing gun, an adapter for inserting traction studs into a hole molded in the tread portion of a tire, said adapter comprises:
    a hollow guide rod;
    a plurality of radially inwardly biased fingers, said fingers disposed circumferentially around a free end of said hollow rod with one end of said fingers affixed to said free end of said hollow guide rod, said fingers having free ends axially extending beyond said free end of said hollow rod; and
    a cam rod axially and slideably disposed within said guide rod.

2. An adapter according to claim 1 in which the can rod has a traction stud receiving end portion.

3. An adapter according to claim 1 in which the fingers are fabricated from spring plate.

4. An adapter according to claim 1 in which the fingers are fabricated from rods.

5. An adapter according to claims 3 or 4 in which the fingers converge with decreasing diameter at the free end of the fingers.

6. An adapter according to claim 3 in which the fingers are secured within channeled grooves extending axially on the outer periphery of said guide rod.

7. An adapter according to claim 3 in which the fastened end of said fingers have radially inward extending fasteners protruding into fastener receiving openings in said guide rod.

8. An adapter according to claim 4 in which the fingers are radially biased inward by an elastic sphincter.

9. An adapter according to claims 3 or 4 in which the fingers are secured to said guide rod by a spring-wire clamp.

10. An adapter according to claims 3 or 4 in which the fingers are secured to said guide rod by a band clamp.

11. An adapter according to claim 6 in which the guide rod is threaded on the outer peripheral surface.

12. An adapter according to claim 11 in which the fingers are secured within said channels with a lock nut threaded on to said guide rod.

13. An adapter according to claim 1 in which the cam rod is rachet driven.

14. A dispensing gun for inserting traction studs into a hole molded in the tread portion of a tire, said gun comprising:

a hollow, tubular guide rod;

a cam rod slideably disposed within said guide rod;

a plurality of fingers circumferentially disposed and secured around one end of said guide rod, said fingers radially biased inwardly; and a traction stud-receiving portion in one end of said cam rod, said cam rod coacting against said fingers to radially distend outwardly, said fingers when said cam rod was forced beyond the end portion of said guide rod of which said fingers are secured.

15. A dispensing gun for inserting traction studs into a hole molded in the tread portion of a tire, wherein the improvement comprises:

a hollow guide rod;

a plurality of radially inwardly biased fingers, said fingers disposed circumferentially around a free end of said hollow rod with one end of said fingers affixed to said free end of said hollow guide rod, said fingers having free ends axially extending beyond said free end of said hollow rod;

a cam rod axially and slideably disposed within said guide rod; and a traction stud-receiving portion in one end of said cam rod, said cam rod coacting against said fingers to radially distend outwardly, said fingers when said cam rod was forced beyond the end portion of said guide rod of which said fingers are secured.